United States Patent
Thoren et al.

(10) Patent No.: US 11,859,843 B2
(45) Date of Patent: Jan. 2, 2024

(54) SYSTEM AND METHOD FOR CONTROLLING HVAC SYSTEMS

(71) Applicant: Daikin Manufacturing Company, L.P., Waller, TX (US)

(72) Inventors: Dennis Thoren, Lindale, TX (US); Tao Jia, Mooreseville, NC (US); Jacky Chen, Katy, TX (US); Hugh Dubberly, San Francisco, CA (US)

(73) Assignee: Daikin Manufacturing Company, L.P., Waller, TX (US)

( * ) Notice: Subject to any disclaimer, the term of this patent is extended or adjusted under 35 U.S.C. 154(b) by 92 days.

(21) Appl. No.: 17/139,378

(22) Filed: Dec. 31, 2020

(65) Prior Publication Data

US 2021/0199333 A1    Jul. 1, 2021

Related U.S. Application Data

(60) Provisional application No. 62/956,214, filed on Dec. 31, 2019.

(51) Int. Cl.
*F24F 11/523*    (2018.01)
*F24F 11/80*    (2018.01)

(52) U.S. Cl.
CPC ............ *F24F 11/523* (2018.01); *F24F 11/80* (2018.01)

(58) Field of Classification Search
CPC ......... F24F 11/523; F24F 11/80; Y02B 30/13; F24D 5/04; F24D 5/12; F24D 19/1087; F24H 9/2085; G05D 23/1919
See application file for complete search history.

(56) References Cited

U.S. PATENT DOCUMENTS

| | | | |
|---|---|---|---|
| 2007/0045444 A1 | 3/2007 | Gray et al. | |
| 2012/0061068 A1* | 3/2012 | Anderson | F24F 11/74 236/1 C |
| 2012/0310418 A1 | 12/2012 | Harrod et al. | |
| 2014/0365019 A1* | 12/2014 | Gourlay | F24F 11/62 700/278 |
| 2018/0158315 A1 | 6/2018 | Sloo et al. | |
| 2020/0116378 A1* | 4/2020 | Heintzelman | F24F 11/46 |

OTHER PUBLICATIONS

International Search Report and Written Opinion dated Mar. 29, 2021 for corresponding PCT Patent Application PCT/US2020/067695 filed on Dec. 31, 2020.

* cited by examiner

*Primary Examiner* — Nelson J Nieves
*Assistant Examiner* — Matthew John Moscola
(74) *Attorney, Agent, or Firm* — K&L Gates LLP

(57) ABSTRACT

A control device for an HVAC system is provided. Embodiments of the present disclosure generally relate to control devices that facilitate adjustment of heating and cooling setpoints. In one embodiment, the control device allows for concurrent adjustment of the heating and cooling setpoints while maintaining a desired deadband value therebetween.

9 Claims, 3 Drawing Sheets

SYSTEM AND METHOD FOR CONTROLLING HVAC SYSTEMS

CROSS REFERENCE TO RELATED APPLICATIONS

This application claims priority to and benefit of U.S. Provisional Patent Application No. 62/956,214, entitled "System and Method For Controlling HVAC Systems," filed on Dec. 31, 2019, and which is herein incorporated by reference.

BACKGROUND

This section is intended to introduce the reader to various aspects of the art that may be related to various aspects of the presently described embodiments—to help facilitate a better understanding of various aspects of the present embodiments. Accordingly, it should be understood that these statements are to be read in this light, and not as admissions of prior art.

Modern residential and industrial customers expect indoor spaces to be climate controlled. In general, heating, ventilation, and air-conditioning ("HVAC") systems circulate an indoor space's air over low-temperature (for cooling) or high-temperature (for heating) sources, thereby adjusting the indoor space's ambient air temperature. HVAC systems generate these low- and high-temperature sources by, among other techniques, taking advantage of a well-known physical principle: a fluid transitioning from gas to liquid releases heat, while a fluid transitioning from liquid to gas absorbs heat.

Within a typical HVAC system, a fluid refrigerant circulates through a closed loop of tubing that uses compressors and other flow-control devices to manipulate the refrigerant's flow and pressure, causing the refrigerant to cycle between the liquid and gas phases. Generally, these phase transitions occur within the HVAC's heat exchangers, which are part of the closed loop and designed to transfer heat between the circulating refrigerant and flowing ambient air. As would be expected, the heat exchanger providing heating or cooling to the climate controlled space or structure is described adjectivally as being "indoor," and the heat exchanger transferring heat with the surrounding outdoor environment is described as being "outdoor."

The refrigerant circulating between the indoor and outdoor heat exchangers—transitioning between phases along the way—absorbs heat from one location and releases it to the other. Those in the HVAC industry describe this cycle of absorbing and releasing heat as "pumping." To cool the climate-controlled indoor space, heat is "pumped" from the indoor side to the outdoor side. And the indoor space is heated by doing the opposite, pumping heat from the outdoors to the indoors. In addition, the indoor space may be heated using a furnace that ignites a hydrocarbon—such as natural gas, propane, or heating oil—to provide a heating source.

Whether the HVAC system is heating or cooling the indoor space is often controlled by a control device, such as a thermostat. The occupant may use the thermostat to set heating and cooling "setpoints." When the thermostat detects the indoor space's temperature has exceed the cooling setpoint, typical thermostats send a cooling call to the HVAC system, causing the HVAC to provide a cooling function to the indoor space. On the opposite end, when the thermostat detects the indoor space's temperature has fallen below the heating setpoint, the thermostat sends a heating call to the HVAC system, causing the HVAC system to provide a heating function to the indoor space.

The temperature band between the cooling setpoint and the heating setpoint is often referred to as the "deadband." So long as the thermostat detects the indoor space's temperature is within the deadband, the HVAC does not provide heating and cooling functions. In regions where intra-day temperatures have large fluctuations, having a large deadband reduces resource consumption (e.g., electricity) by the HVAC system.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to systems and methods for controlling an HVAC system. In one embodiment, an HVAC control device, such as a thermostat, allows a user to enter cooling and heating setpoints using a touchscreen, thereby defining a deadband. The user then may, again using the touchscreen, adjust the both setpoints concurrently, maintaining the previously set deadband value.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Figure 1:
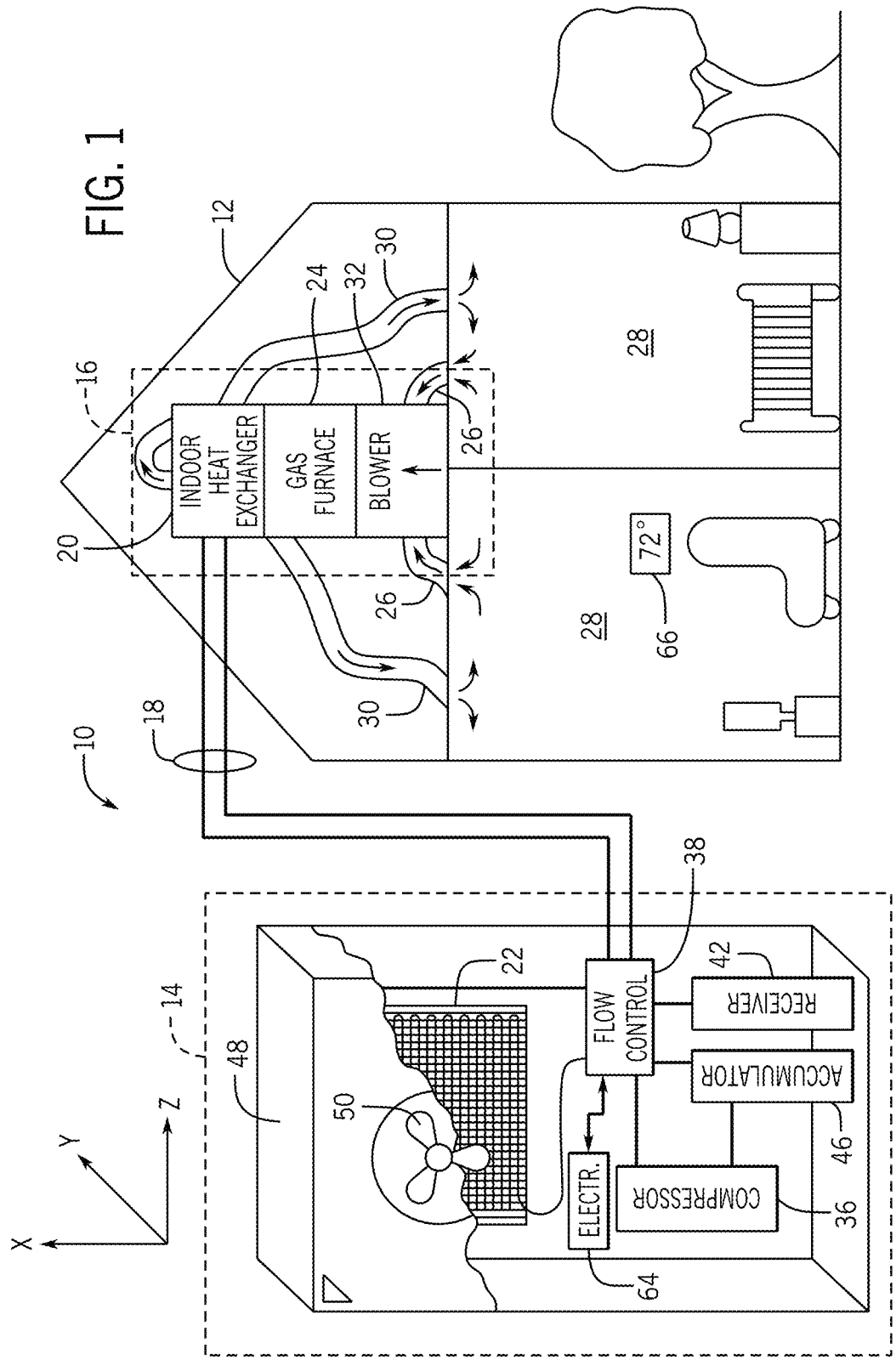
FIG. 1 illustrates schematically an HVAC system for heating and cooling indoor spaces within a structure, in accordance with an embodiment of the present dis closure.

Turning now the figures, FIG. 1 illustrates an HVAC system 10 in accordance with one embodiment. As depicted, the system 10 provides heating and cooling for a residential structure 12. But the concepts disclosed herein are applicable to a myriad of heating and cooling situations, including industrial and commercial settings.

The described HVAC system 10 divides into two primary portions: The outdoor unit 14, which mainly comprises components for transferring heat with the environment outside the structure 12; and the indoor unit 16, which mainly comprises components for transferring heat with the air inside the structure 12. To heat or cool the illustrated structure 12, the indoor unit 16 has an air-handler unit (or AHU) that is an airflow circulation system, which in the illustrated embodiment draws ambient indoor air via returns 26, passes that air over one or more heating/cooling elements (i.e., sources of heating or cooling), and then routes that conditioned air, whether heated or cooled, back to the various climate-controlled spaces 28 through ducts or ductworks 30—which are relatively large pipes that may be rigid or flexible. A blower 32 provides the motivational force to circulate the ambient air through the returns 26, AHU, and ducts 30.

As shown, the HVAC system 10 is a "dual-fuel" system that has multiple heating elements. A gas furnace 24 located downstream (in terms of airflow) of blower 32 combusts natural gas to produce heat in furnace tubes (not shown) that coil through the furnace. These furnace tubes act as a heating element for the ambient indoor air being pushed out of the blower 32, over the furnace tubes, and into the ducts 30. However, the furnace is generally operated when robust heating is desired. During conventional heating and cooling operations, air from the blower 32 is routed over an indoor heat exchanger 20 and into the ductwork 30. The blower, gas furnace, and indoor heat exchanger may be packaged as an integrated AHU, or those components may be modular. Moreover, it is envisaged that the positions of the gas furnace and indoor heat exchanger and blower can be reversed or rearranged.

The indoor heat exchanger 20 can act as a heating or cooling element that add or removes heat from the structure, respectively, by manipulating the pressure and flow of refrigerant circulating within and between the indoor and outdoor units via refrigerant lines 18. But that is just one embodiment. It is also envisaged that the refrigerant could be circulated to only cool (i.e., extract heat from) the structure, with heating provided independently by another source—like a gas furnace, for example. Or there may be no gas heating. Or in another embodiment there may be no heating of any kind. HVAC systems that use refrigerant to both heat and cool the structure 12 are often described as heat pumps, while systems that use refrigerant only for cooling are commonly described as air conditioners.

Whatever the state of the indoor heat exchanger (i.e., absorbing or releasing heat), the outdoor heat exchanger 22 is in the opposite state. More specifically, if heating is desired, the illustrated indoor heat exchanger 20 acts as a condenser, aiding transition of the refrigerant from a high-pressure to gas to a high-pressure liquid and releasing heat in the process. And the outdoor heat exchanger 22 acts as an evaporator, aiding transition of the refrigerant from a low-pressure liquid to a low-pressure gas, thereby absorbing heat from the outdoor environment. If cooling is desired, the outdoor unit 14 has flow-control devices 38 that reverse the flow of the refrigerant—such that the outdoor heat exchanger acts as a condenser and the indoor heat exchanger acts as an evaporator. To facilitate the exchange of heat between the ambient indoor air and the outdoor environment in the described HVAC system 10, the respective heat exchangers 20, 22 have tubing that winds or coils through heat-exchange surfaces, to increase the surface area of contact between the tubing and the surrounding air or environment. As a result, a substantial portion of the tubing that comprises the refrigerant loop is found in the heat exchangers.

In the illustrated embodiment, the outdoor unit 14 is a side-flow unit that houses, within a plastic or metal casing or housing 48, the various components that manage the refrigerant's flow and pressure. This outdoor unit 14 is described as a side-flow unit because the airflow across the outdoor heat exchanger 22 is motivated by a fan that rotates about an axis that is non-perpendicular with respect to the ground. In contrast, traditional "up-flow" devices generate airflow by rotating a fan about an axis generally perpendicular to the ground. (As illustrated, the X-axis is perpendicular to the ground.) In one embodiment, the side-flow outdoor unit 14 may have a fan 50 that rotates about an axis that is generally parallel to the ground. (As illustrated, the Y- and Z-axes are parallel to the ground.)

Advantageously, the side-flow outdoor unit 14 provides a smaller footprint than traditional up-flow units, which are more cubic in nature. This smaller footprint allows the side-flow outdoor unit to be installed in tighter spaces, where sufficient horizontal spacing for an up-flow unit is not available. For example, the side-flow outdoor unit 14 may be particularly beneficial for heating and/or cooling a residential structure that comes up to or that is very close to the structure's property line.

But the smaller footprint of the side-flow outdoor unit 14 can reduce the available space within the outdoor unit's casing 48—space that is used to mount the equipment that helps circulate and controls the flow of the refrigerant. For example, the described outdoor unit 14 has an accumulator 46 that helps prevents liquid refrigerant from reaching the inlet of a compressor 36. And the outdoor unit 14 has a receiver 42 that helps maintains a sufficient volume of refrigerant in the system. The size of these components is often defined by the amount of refrigerant employed by the system. For example, the receiver may be sized such that it is fifteen percent (15%) larger than the total amount of refrigerant present in the system. Or the system may be designed without a receiver, but it may have an accumulator that is sized for the amount of refrigerant in the system—the accumulator taking up valuable space in the casing 48. Advantageously, the outdoor unit may have electrical circuity 64 that monitors and assists in the control of the outdoor unit.

The structure's occupant may control the HVAC system 10 using a control device, such as a thermostat 66, that allows the user to see what the measured temperature of the room is as well as allowing the user to enter setpoints that will activate the heating or cooling functions when the indoor space's temperature reaches the respective heating or cooling setpoints.

Figure 2:
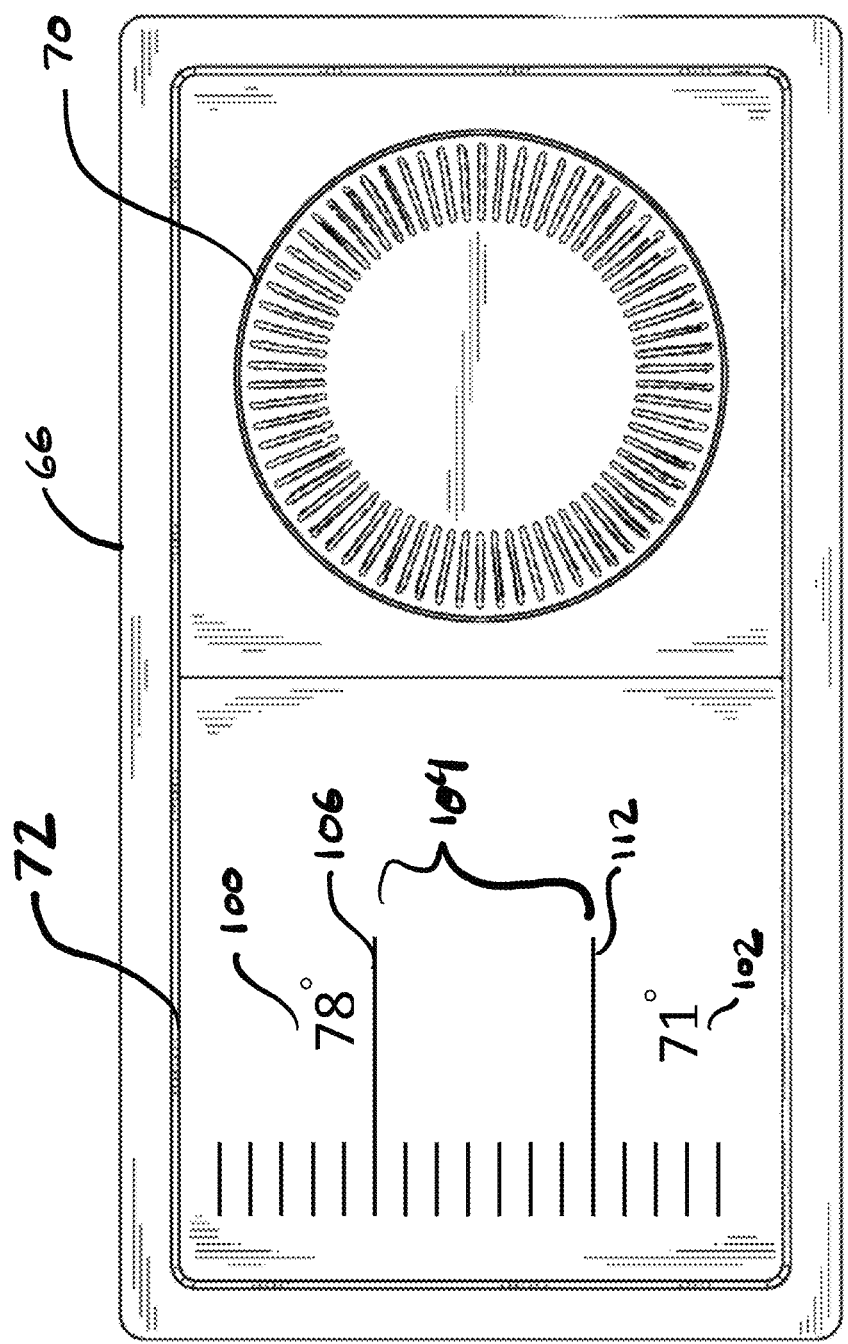
FIG. 2 illustrates schematically a touchscreen HVAC control device, in accordance with an embodiment of the present disclosure.

FIG. 2 illustrates an exemplary thermostat in accordance with one embodiment of the invention. The thermostat has two primary interfaces to receive inputs from and communicate with the user: a dial 70 that allows the user to provide inputs and adjust various functions of the thermostat and a display 72 that visually communicates information to the user. Advantageously, the illustrated display 72 is a touchscreen display that also allows the user to provide inputs and adjust the thermostat's functions, independent of or in conjunction with the dial 70.

In the illustrated thermostat, the heating setpoint 100 is set at 78° F. and the cooling setpoint 102 is set at 71° F. As shown, the thermostat has been set with a deadband value 104 of 7° F. that sits between the two set points. If the thermostat reads the indoor space's 28 temperature as being between the two setpoints, it will not request the heating or cooling functions from the HVAC system. However, if the thermostat reads a temperature above 78° F., it will call for cooling. And if the thermostat reads a temperature below 71° F., it will call for heating.

The user may adjust each setpoint individually, using either the dial 70 or the touchscreen display 72. Indeed, the user may adjust the cooling setpoint by touching the cooling setpoint bar 106 and either turning the dial 70 or moving his or her finger upwardly or downwardly to get to the desired setpoint. Similarly, the user may do the same to set the change the heating setpoint by pressing the heating setpoint bar 112. By manipulating the heating and cooling setpoint individually, the user can change the defined deadband. For example, if the user were to lower the cooling setpoint to 77° F. and raiser the heating setpoint to 72° F., the new deadband value would be narrowed to 5° F.

If the setpoints are set too close—i.e., the deadband value is just a few degrees—it could cause the heating and cooling functions to compete against one another, causing inefficient operation. Accordingly, the thermostat may have programming stored on control circuitry that prevents the deadband value from being below a preset value—such as 1° or 2° F. That programing may also prevent the heating setpoint from being above the cooling setpoint, or the cooling setpoint being below the heating setpoint.

Figure 3:
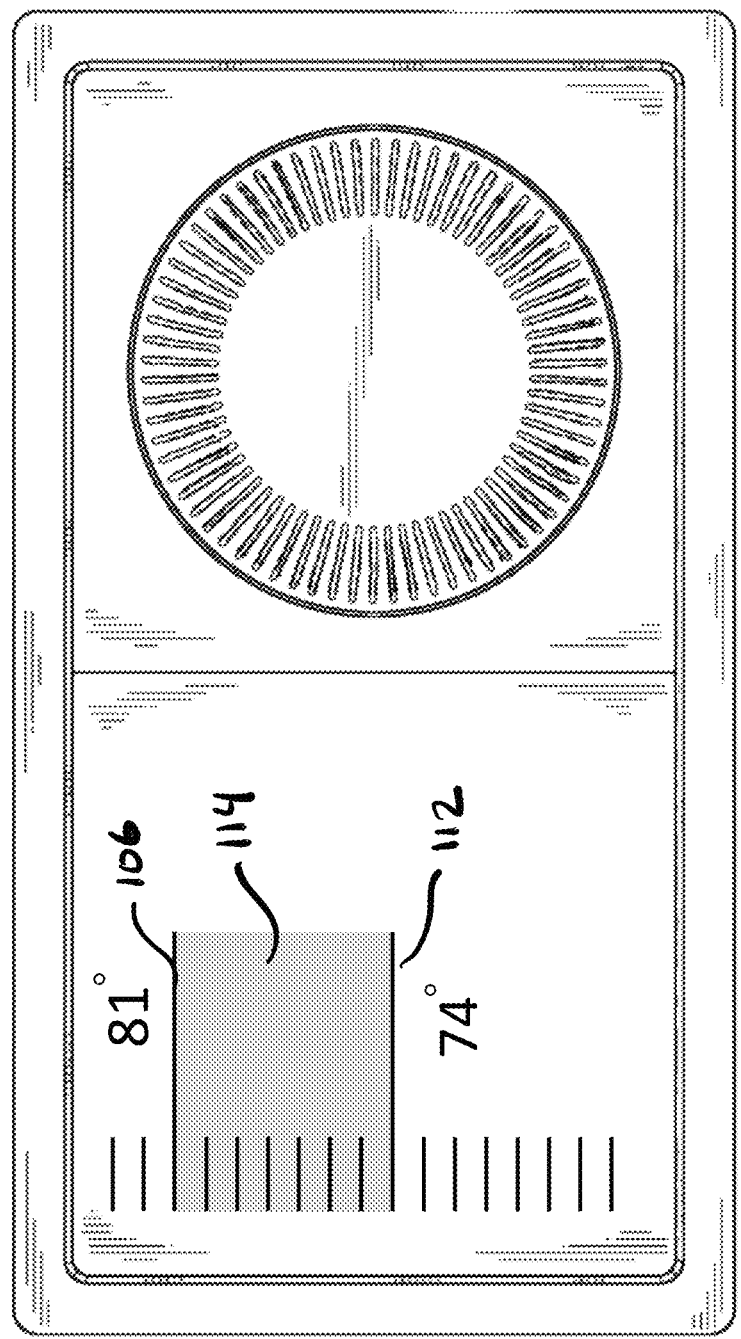
FIG. 3 illustrates schematically the touchscreen HVAC control device of FIG. 2 in an adjusted configuration.

While in some instances the user may wish to adjust the setpoints individually, the user may be desire to adjust both setpoints concurrently but maintaining the same or substantially the same deadband value. In FIG. 3, the user, by using the touchscreen to select a point between the two setpoints, has activated the thermostats deadband adjustment 114, which allows adjustment of the setpoints but maintains the previously set 7° F. deadband value as shown in FIG. 2. For example, as shown in FIG. 3, by using the dial or touchscreen, the user could raise the cooling setpoint to 81° F. and heating setpoint to 74° F., maintaining the 7° F. deadband value between the two setpoints.

It is envisaged that this deadband based adjustment could be used to adjust various functions of the thermostat, including adjusting setpoints at preprogramed times—such as during expected sleep times or times when the indoor space is expected to be empty.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An HVAC control device, comprising:
a display configured to display a heating setpoint and a cooling setpoint, the heating and cooling setpoints defining a defined deadband value therebetween that is greater than a preset deadband value, wherein the display is also configured to display the defined deadband value between the heating setpoint and the cooling setpoint; and
one or more user interfaces configured to:
allow a user to adjust either the heating setpoint or the cooling setpoint, while the display is displaying the heating setpoint, the cooling setpoint, and the defined deadband value therebetween, to adjust the defined deadband value therebetween while maintaining the defined deadband greater than the preset deadband value; and
allow the user to select the displayed defined deadband value and then adjust the heating setpoint and the cooling setpoint concurrently, while the display is displaying the heating setpoint, the cooling setpoint, and the defined deadband value therebetween, by adjusting the heating setpoint and the cooling setpoint while maintaining the defined deadband value substantially the same.

2. The HVAC control device of claim 1, wherein the one or more user interfaces include a dial.

3. The HVAC control device of claim 1, wherein the one or more user interfaces include a touchscreen.

4. The HVAC control device of claim 1, wherein the preset deadband value is less than or equal to two degrees Fahrenheit (2° F.).

5. The HVAC control device of claim 1, wherein the preset deadband value is less than or equal to one degree Fahrenheit (1° F.).

6. The HVAC control device of claim 1, wherein the cooling setpoint is prevented from being below the heating setpoint.

7. The HVAC control device of claim 1, wherein the defined deadband value between the heating setpoint and the cooling setpoint remains the same when the heating setpoint and the cooling setpoint are adjusted concurrently.

8. A method of controlling an HVAC device, comprising:
receiving, by a user using one or more user interfaces, a heating setpoint and a cooling setpoint, a difference between the cooling setpoint and the heating setpoint defining a defined deadband value that is greater than a preset deadband value;
displaying the heating setpoint, the cooling setpoint, and the defined deadband value therebetween on a display;
adjusting, by the user using the one or more user interfaces, either the heating setpoint or the cooling setpoint, while the display displays the heating setpoint and the cooling setpoint, to adjust the defined deadband value therebetween while maintaining the defined deadband value greater than the preset deadband value; and
selecting, by the user using the one or more user interfaces, the displayed defined deadband value and then adjusting the heating setpoint and the cooling setpoint concurrently, while the display is displaying the heating setpoint and the cooling setpoint, by adjusting the heating setpoint or the cooling setpoint while maintaining the defined deadband value substantially the same.

9. The method of controlling an HVAC device of claim 8, further comprising maintaining the defined deadband value the same during the concurrent adjustment.

\* \* \* \* \*